United States Patent [19]

Akachi et al.

[11] Patent Number: 5,556,672
[45] Date of Patent: Sep. 17, 1996

[54] WEATHER STRIP ATTACHING STRUCTURE

[75] Inventors: Keiji Akachi; Atsushi Hikosaka, both of Aichi, Japan

[73] Assignee: Toyoda Gosei Co., Ltd., Nishikasugai-gun, Japan

[21] Appl. No.: 371,491

[22] Filed: Jan. 11, 1995

Related U.S. Application Data

[63] Continuation of Ser. No. 32,550, Mar. 17, 1993, abandoned.

[30] Foreign Application Priority Data

Mar. 18, 1992 [JP] Japan ..................... 4-092217

[51] Int. Cl.$^6$ ..................... F06B 7/16
[52] U.S. Cl. ............ 428/33; 49/475.1; 296/201; 428/31; 428/83; 428/304.4
[58] Field of Search ............ 428/31, 83, 33, 428/192, 304.4; 296/146.1, 201; 49/488, 490, 498

[56] References Cited

U.S. PATENT DOCUMENTS 4,872,288  10/1989  Nozaki .
5,072,545  12/1991  Nozaki .

FOREIGN PATENT DOCUMENTS 6290860  6/1987  Japan .

Primary Examiner—Marion E. McCamish
Assistant Examiner—Blaine R. Copenheaver
Attorney, Agent, or Firm—Cushman, Darby & Cushman, L.L.P.

[57] ABSTRACT

A weather strip attaching structure with which a weather strip can be readily attached to a retainer without use of a roller jig or the like. In the structure according to the present invention for attaching a weather strip 50 to a retainer 70 provided along a door opening 10 of a vehicle body, the weather strip 50 includes a hollow sealing portion 56 for being sealingly abutted against the edge portion of a door glass plate 40, and an attaching base portion 52 having engaging protrusions 54a and 54b, which are meant to engage with engaging recesses 74 and 76 of the retainer 70. The hollow sealing portion 56 has at least one inclined side wall 57. The retainer 70 comprises a bottom 72 which is mounted on the vehicle body, the engaging recesses 74 and 76 formed at opposite ends of the bottom 72, and an inclined supporting portion 78 provided above the engaging recess 76, for supporting the inclined side wall 57 of the hollow sealing portion 56 of the weather strip. The depth (T) of the engaging recess 76 located below the inclined supporting portion 78 is at least 1.5 times the thickness (t) of the engaging protrusion 54b.

6 Claims, 3 Drawing Sheets

WEATHER STRIP ATTACHING STRUCTURE

This is a continuation of application Ser. No. 8/32,550, filed on Mar. 17, 1993, which is abandoned.

BACKGROUND OF THE INVENTION

1. Field of the Invention:

This invention relates to weather strip attaching structures for motor vehicles, and more particularly to a weather strip attaching structure for fitting the attaching base portion of a weather strip in a retainer provided along an door opening of the vehicle body.

2. Description of Related Art:

In a hard-top type motor vehicle as shown in FIG. 5, a retainer 20 as shown in FIG. 4 (which is a sectional view taken along line 4—4 in FIG. 5) is provided along a door opening 10 of the vehicle body, and a weather strip 30 is attached to the retainer thus provided.

The retainer 20 is substantially U-shaped in section, opening in one direction. The opening of the retainer 20 is narrowed so that the weather strip 30 is fixedly engaged with the retainer 20. More specifically, the retainer 20 has a bottom 22, and engaging recesses 24 and 26 at both ends of the bottom 22. The attaching base portion 32 of the weather strip 30 has engaging protrusions 34 and 34 extended from its both ends, which are fitted in the engaging recesses 24 and 26 of the retainer 20 so that the weather strip 30 is fixedly engaged with the retainer 20. The weather strip 30 further comprises a hollow sealing portion 36 which is integral with the attaching base portion 32. The hollow sealing portion 36 is sealingly abutted against the edge of the door glass plate or the door frame.

The attaching base portion 32 of the weather strip 30 is, in general, fit in the retainer 20 as follows. First, as shown in FIG. 4, one of the engaging protrusions 34 of the attaching base portion 32 is inserted into the engaging recess 24 of the retainer 20, and, under this condition, the other engaging protrusion 34 is pushed into the other engaging recess 26 by using a roller jig 60.

As described above, the opening of the retainer 20 is narrow. Hence, in pushing the engaging protrusion into the engaging recess (hereinafter referred to as "a push-in operation", when applicable) with the roller jig 60, it is necessary to apply a great pushing force to the weather strip, and moreover the roller jig 60 must be used several times. Thus, the push-in operation takes time and labor. To achieve the push-in operation more readily, a weather strip attaching structure has been proposed in which the attaching base portion is partially made of a high-expansion foaming material so that it is more flexible (cf. Japanese Utility Patent Application (OPI) No. 90860/1987 (the term "OPI" as used herein means an "unexamined published application")). However, the weather strip attaching structure thus proposed is still disadvantageous in the following point: In the weather strip attaching structure, the thickness (t) of the engaging protrusion is substantially equal to the depth (T) of the engaging recess. Hence, before the outer end portion of the engaging protrusion rides over the edge of the engaging recess, the base portion of the engaging protrusion abuts against the bottom of the retainer, which obstructs the push-in operation.

SUMMARY OF THE INVENTION

In view of the foregoing, an object of this invention is to provide a weather strip attaching structure with which a weather strip can be readily attached to a retainer without use of a roller jig or the like.

This object of the invention has been achieved by the provision of a structure for attaching a weather strip to a retainer provided along a door opening of a vehicle body. According to the invention, the weather strip includes a hollow sealing portion, which may be sealingly abutted against the edge portion of a door glass plate and an attaching base portion having engaging protrusions, which may be engaged with engaging recesses of the retainer. The hollow sealing portion has at least one side wall that is inclined. The retainer includes a bottom for mounting on the vehicle body, engaging recesses formed at both ends of the bottom, and an inclined supporting portion provided above one of the engaging recesses for supporting the inclined side wall of the hollow sealing portion of the weather strip when the weatherstrip is attached to the retainer, and the depth (T) of the engaging recess located below the inclined supporting portion is at least 1.5 times the thickness (t) of the engaging protrusions.

The attaching base portion of the weather strip is attached to the retainer as follows. First, one of the engaging protrusions is fit in one of the engaging recesses of the retainer, and then the other engaging protrusion is pushed into the other engaging recess. In this operation, since the depth (T) of the engaging recess disposed below the inclined supporting portion is at least 1.5 times the thickness (t) of the engaging protrusions, the base portion of the other engaging protrusion will never abut against the bottom of the retainer before the outer end portion thereof rides over the edge of the other engaging recess. Hence, the weather strip can be readily attached to the retainer manually without use of a roller jig or the like.

When the other engaging protrusion, riding over the edge of the engaging recess disposed below the inclined supporting portion, has been fit into the recess, the inclined side wall of the weather strip is supported by the inclined supporting portion of the retainer. Therefore, the weather strip is fixedly positioned, and it will not drop in the engaging recess even if there is a space in the recess. Thus, the weather strip is positively held in the retainer. The inclined side wall and the other engaging protrusion of the weather strip hold the edge portion of the other engaging recess of the retainer. Hence, locking force applied to the weather strip is higher than in the prior art.

BRIEF DESCRIPTION OF THE DRAWINGS

Other objects, features and characteristics of the present invention, as well as the methods of operation and function of the related elements of structure, and to the combination of parts and the economies of manufacture, will become apparent upon consideration of the following description and the appended claims with reference to the accompanying drawings, all of which form a part of this specification. In the drawings, like reference numerals represent like parts.

DETAILED DESCRIPTION OF THE PRESENTLY PREFERRED EXEMPLARY EMBODIMENTS

To assist in acquiring a full understanding of the invention, the preferred embodiments thereof are described below with reference to the accompanying drawings.

Figure 1:
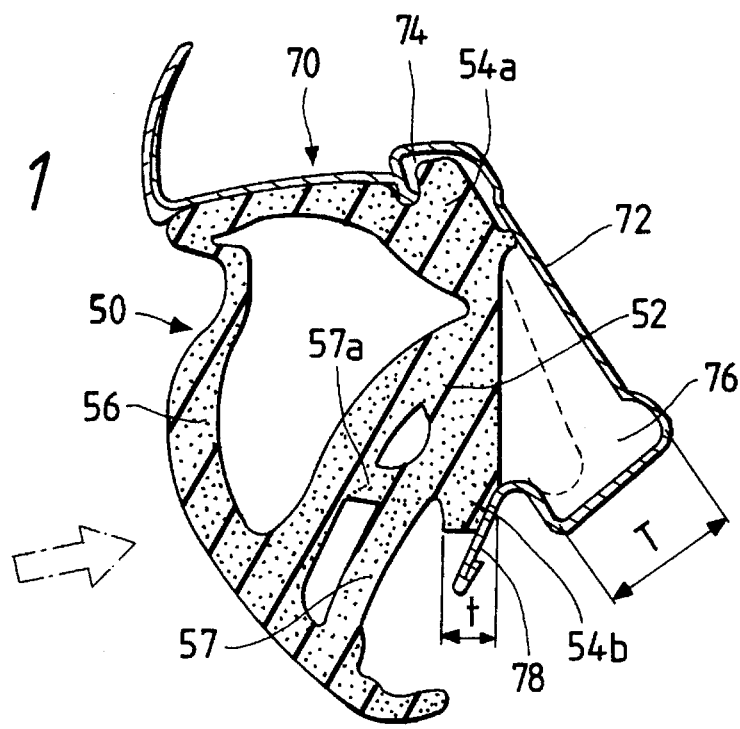
FIG. 1 is a sectional view taken along line 4—4 in FIG. 5, showing a weather strip attaching structure, according to a first embodiment of this invention.
Figure 4:
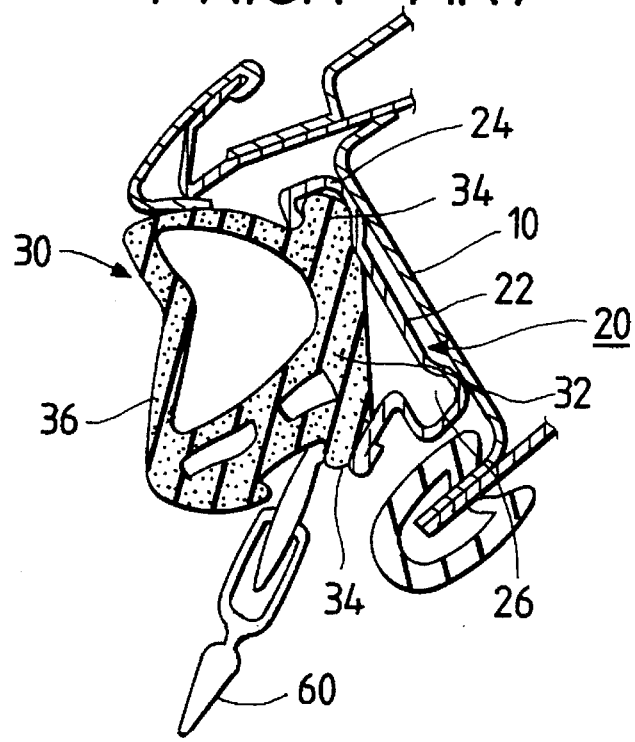
FIG. 4 is a sectional view taken along line 4—4 in FIG. 5, showing a conventional weather strip attaching structure.

A first embodiment of the invention is shown in FIG. 1, in which parts corresponding functionally to those which have been described with reference to FIG. 4 are designated by the same reference numerals or characters.

Figure 5:
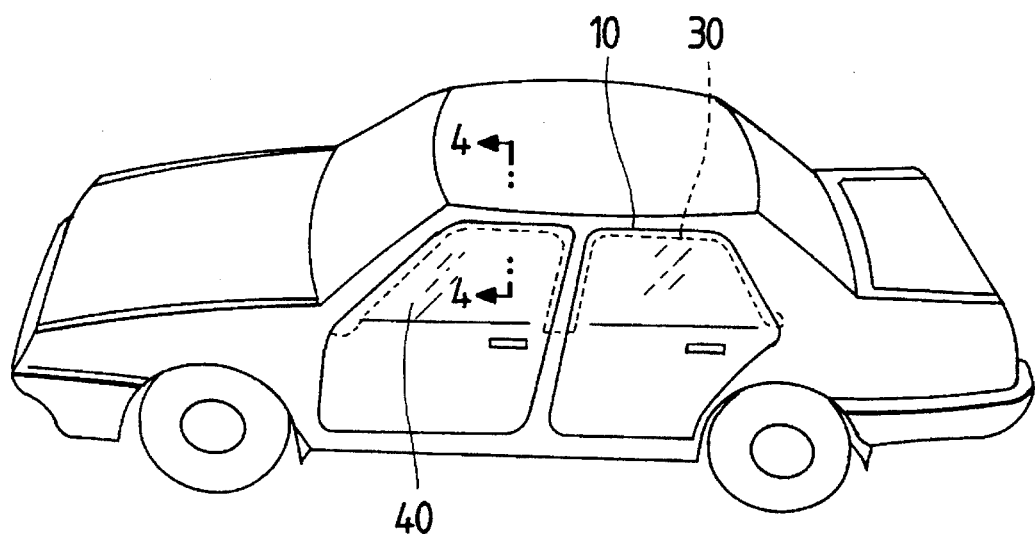
FIG. 5 is a perspective view of a motor vehicle.

In the first embodiment shown in FIG. 1, a weather strip 50 made of EPDM sponge rubber (ethylene-propylene-diene monomer) is fit in a retainer 70 provided along a door opening 10 (FIG. 5) of a motor vehicle.

The weather strip 50 includes a hollow sealing portion 56, which may sealingly abut against the edge of a door glass plate 40 and an attaching base portion 52 having first and second engaging protrusions 54a and 54b, which are engaged with first and second engaging recesses 74 and 76 of the retainer 70, respectively. The hollow sealing portion 56 has a side wall 57 on the side of the vehicle body (hereinafter referred to as "an inner side wall 57", when applicable). The inner side wall 57 is inclined with respect to the attaching base portion 52. The inner side wall 57 is of a double-wall structure; that is, it is reinforced with a coupling portion 57a at the middle which is extended substantially perpendicular to the attaching base portion 52.

The retainer 70 includes a bottom 72 which is mounted on the body 10 (FIG. 5), first and second engaging recesses 74 and 76 provided at both ends of the bottom 72 so that they are engaged with the above-described first and second engaging protrusions 54a and 54b, respectively, and an inclined supporting portion 78 which is provided above the second engaging recess 76 so as to support the inclined inner side wall 57 of the hollowing sealing portion 56. The depth (T) of the second engaging recess 76, which comes inside the vehicle body, is more than 1.5 times the thickness (t) of the engaging protrusion 54b (twice in the pictured embodiment). On the other hand, the depth of the first engaging recess 74 which comes outside the vehicle body is substantially equal to the thickness (t) of the engaging protrusions 54a. The angle of inclination of the inclined supporting portion 78 is equal to that of the inclined inner side wall 57 of the hollow sealing portion 56 of the weather strip 50.

In the embodiment, the weather strip 50 is attached as follows.

As shown in FIG. 1, the first engaging protrusion 54a of the weather strip 50, which comes outside the vehicle body, is inserted into the first engaging recess 74 of the retainer 70. Under this condition, the hollow sealing portion 56 is pushed by hand in the direction of the arrow so that the attaching base portion 52 is bent at the V-shaped middle portion, whereby the second engaging protrusion 54 of the attaching base portion 52 is pushed into the second engaging recess 76 while being guided by the sloped surface of the inclined supporting portion 78 of the retainer 70. The inclined inner side wall 57 of the hollow sealing portion 56 of the weather strip 50 is supported by the sloped surface of the inclined supporting portion 78. Thus, the weather strip has been attached to the retainer. The coupling portion 57a is formed at the middle of the inner side wall 57, which is a double-walled structure, in such a manner that it acts against the pushing force applied to the hollow sealing portion 56. Hence, when the hollow sealing portion 56 is pushed by hand as described above, the inner side wall 57 is hardly deformed, thus allowing the pushing force to be positively transmitted to the attaching base portion. The attaching base portion 52 is intended to be bent at the middle V-shaped portion.

The depth (T) of the engaging recess 76 of the retainer 70, which is just below the inclined supporting portion 78, is twice the thickness (t) of the engaging protrusion 54b of the attaching base portion 52 of the weather strip 50. Hence, in the case when, after the first engaging protrusion 54a of the attaching base portion 52 has been inserted into the first engaging recess 74 of the retainer 70, the second engaging protrusion 54b is pushed into the second engaging recess 76, the base portion 52 of the engaging protrusion will not abut against the bottom 72 of the retainer 70 before the outer end portion of the engaging protrusion 54 rides over the edge of the second engaging recess 76. That is, it can be readily achieved to cause the outer end portion of the second engaging protrusion to ride over the edge of the second engaging recess, and to push the second engaging protrusion into the second engaging recess.

It is not preferable to make the depth (T) of the engaging recess 76 provided below the inclined supporting portion 78 of the retainer 70 smaller than 1.5 times the thickness (t) of the engaging protrusions 54a and 54b, which are both end portions of the attaching base portion 52 of the weather strip 50, because the base portion of the engaging protrusion 54a or 54b may abut against the bottom 72 of the retainer 70 before its outer end portion rides over the edge of the engaging recess 76. Thus, in this case, it is rather difficult to achieve the push-in operation.

On the other hand, it is also not preferable to set the ratio of the depth (T) to the thickness (t) to an excessively large value, because it may adversely affect the weather strip attaching space. That is, the ratio should be no more than 2.5. In the case of the above-described embodiment, the most suitable ratio is 2.

When the outer end portion of the engaging protrusion 54b, riding over the edge of the engaging recess 76 is fit into the recess 76, the inclined inner side wall 57 of the weather strip 50 is supported by the inclined supporting portion 78 of the retainer 70. Therefore, the weather strip is fixedly positioned, and it will not move in the engaging recess 76 even though a space is present between the base 52 and the bottom 72 at the engaging recess 76. Thus, the weather strip is positively held in the retainer. The inclined inner side wall 57 and the second engaging protrusion 54b of the weather strip 50 hold the edge portion of the engaging recess 76. Hence, the weather strip's locking force is higher than in the prior art.

Figure 2:
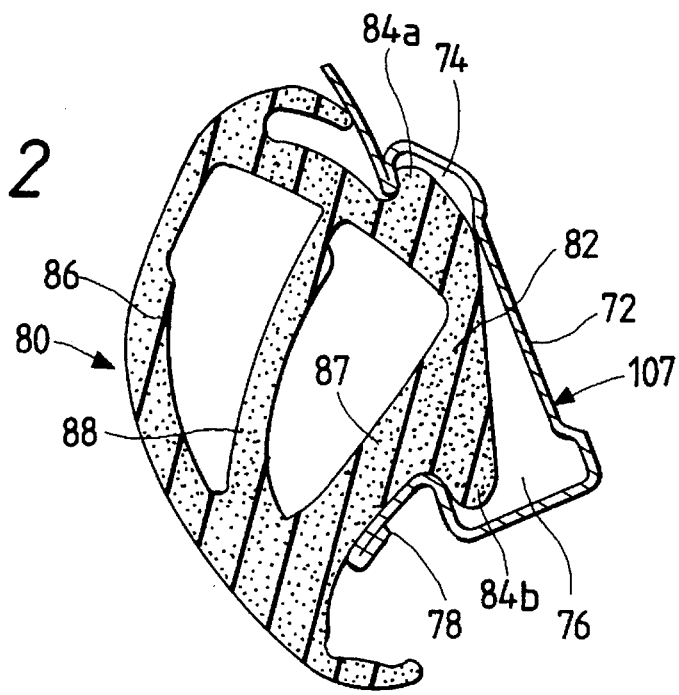
FIG. 2 is a sectional view taken along line 4—4 in FIG. 5, showing one modification of the weather strip attaching structure, according to a second embodiment of the invention.

The invention is not limited to the above-described embodiment. For instance, the weather strip may be modified as shown in FIG. 2. That is, in a second embodiment of the invention, the weather strip 80 has an inner side wall 87 which is of a single-wall structure with a large thickness, and a hollow sealing portion 86 including a bridge portion 88 inside. In this case, its retainer 107 may be the same as the one 70 shown in FIG. 1. The weather strip 80 further comprises an attaching base portion 82 and engaging protrusions 84a and 84b.

Figure 3A:
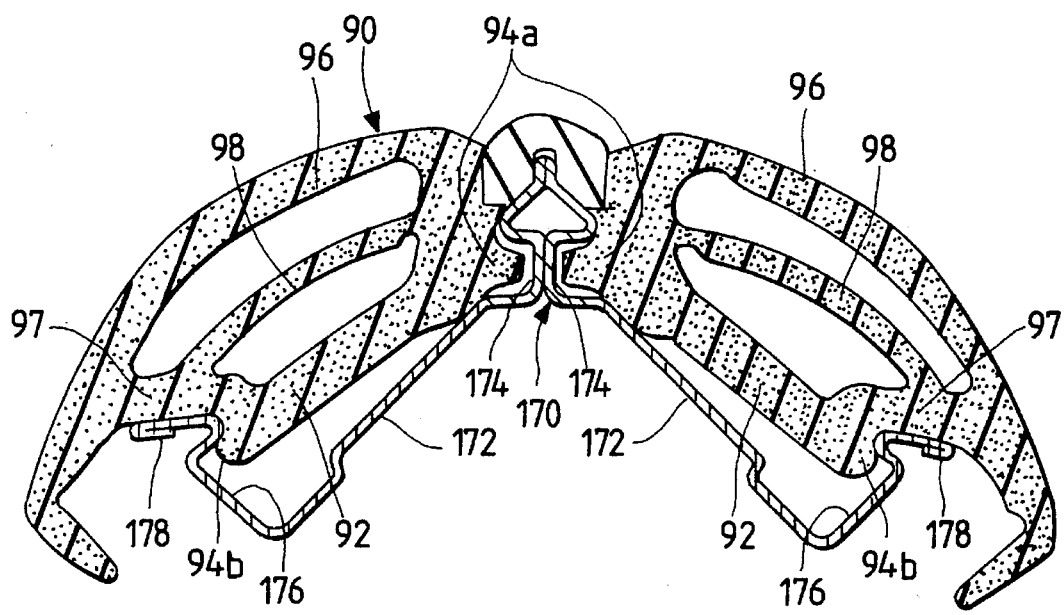
FIG. 3(a) is a sectional view taken at a center pillar, showing another modification of the weather strip attaching structure, according to a third embodiment of the invention.

In addition, the weather strip may be modified as shown in FIG. 3(a). That is, it may be formed by combining a front door weather strip and a rear door weather strip. In this case, as shown in FIG. 3(a), its retainer 170 is the combination of two retainers 70 shown in FIG. 1, and has bottoms 172, engaging recesses 174 and 176, and inclined supporting portions 178. The weather strip 90 has attaching base portions 92, engaging protrusions 94a and 94b, hollow sealing portion 96, inner side walls 97, and bridges 98.

Figure 3B:
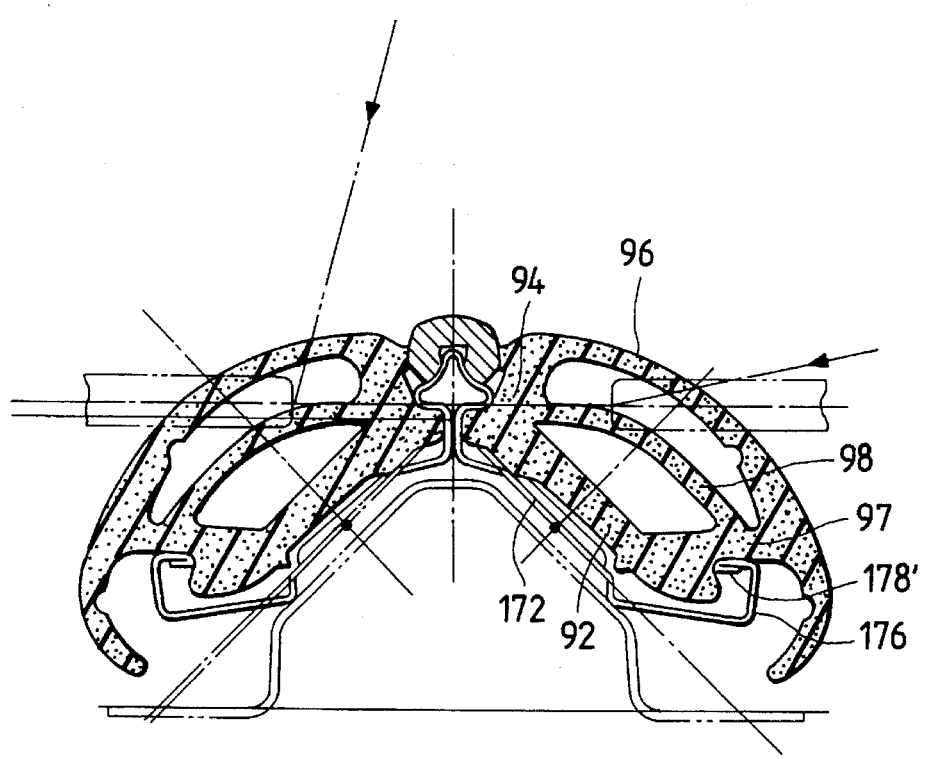
FIG. 3(b) is a sectional view taken at a center pillar, showing further modifications of the weather strip attaching structure according to a fourth embodiment of the invention.

Further, the weather strip may also be modified as shown in FIG. 3(b), which illustrates a further modification of the weather strip shown in FIG. 3(a). In this case, as shown in FIG. 3(b), the inclined supporting portion 178 in the embodiment shown in FIG. 3(a) is modified. In the embodiment shown in FIG. 3(a), the inclined supporting portion 178 is extended outwardly along the inner side wall 97. On the other hand, in the embodiment shown in FIG. 3(b), the inclined supporting portion 178' is extended inwardly along the inner side wall 97.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. The combination of a weather strip and a retainer provided along a door opening of a vehicle body, wherein said weather strip comprises:
a hollow sealing portion abutted against an edge portion of a door glass plate; and
a base portion having first and second engaging protrusions for engaging with first and second engaging portions of said retainer;
said hollow sealing portion having at least one inclined side wall against said base portion, wherein said retainer comprises:
a bottom for mounting on said vehicle body;
said first and second engaging portions formed at opposite ends of said bottom, said first engaging portion being disposed at an outer side of the vehicle body and said second engaging portion being disposed at an inner side of the vehicle body, said base portion being in contact with the retainer between the first and second engaging portions; and
an inclined supporting portion extended from said second engaging portion, for supporting said inclined side wall of said hollow sealing portion of said weather strip, wherein the depth of said second engaging portion is at least 1.5 to 2.5 times the thickness of said second engaging protrusion, wherein a width of said hollow sealing portion is greater than a width of said base portion and a width of said base portion is substantially equal to a width of said retainer including said first and second engaging portions, and wherein said weather strip is attached to said retainer by engagement of the first engaging protrusion of the weather strip with the first engaging portion of the retainer, engagement of the second engaging protrusion with the second engaging portion, and engagement of the inclined supporting portion with the inclined side wall of the hollow sealing portion, which is extended from said base portion to have the same inclination as the inclined supporting portion of the retainer.

2. The combination according to claim 1, wherein said weather strip is made of ethylene-propylene-diene methylene linkage sponge rubber.

3. The combination as claimed in claim 1, wherein said weather strip includes a flexible portion disposed at substantially a middle of said base portion.

4. The combination of a weather strip and a retainer provided along a door opening of a vehicle body, wherein said weather strip comprises:
a hollow sealing portion abutted against an edge portion of a door glass plate; and
a base portion having first and second engaging protrusions for engaging with first and second engaging portions of said retainer;
said hollow sealing portion having at least one side wall inclined with respect to said base portion;

wherein said retainer comprises:
a bottom for mounting on said vehicle body with said first and second engaging portions formed at opposite ends thereof, said first engaging portion being disposed at an outer side of the vehicle body and said second engaging portion being disposed at an inner side of the vehicle body, said base portion being in contact with said retainer between the first and second engaging portions;

wherein said at least one inclined side wall of said hollow sealing portion of said weather strip is supported on said first and second engaging portions, wherein the depth of said second engaging portion is at least 1.5 to 2.5 times the thickness of said second engaging protrusion, wherein a width of said hollow sealing portion is greater than a width of said base portion and a width of said base portion is substantially equal to a width of said retainer including said first and second engaging portions, and wherein said weather strip is attached to said retainer by engagement of the first engaging protrusion of the weather strip with the first engaging portion of the retainer, engagement of the second engaging protrusion with the second engaging portion, and engagement of the inclined supporting portion with the inclined side wall of the hollow sealing portion, which is extended from said base portion to have the same inclination as the inclined supporting portion of the retainer.

5. The combination according to claim 4, wherein said weather strip is made of ethylene-propylene-diene methylene linkage sponge rubber.

6. The combination of a weather strip and a retainer provided along an opening of a vehicle body, wherein said retainer is disposed along an edge of said opening of said vehicle body, and said retainer has a substantially C-shaped cross section and includes first and second spaced engaging portions, wherein said weather strip includes a hollow sealing portion and a mounting base portion, said mounting base portion being engaged with said engaging portion of said retainer and a portion of said mounting base portion being in contact with said retainer between the first and second engaging portions, said mounting base portion of said weather strip includes a substantially V-shaped cross-section, an apex of said mounting base portion being in contact with said retainer, wherein an outer side of said mounting base portion is brought into contact with a bottom surface of said retainer while an inner side of said mounting base portion is away from said bottom surface of said retainer, wherein a width of said hollow sealing portion is greater than a width of said mounting base portion and a width of said mounting base portion is substantially equal to a width of said retainer including the first and second engaging portions, and wherein said weather strip is attached to said retainer by engagement of a first engaging protrusion of the mounting base portion with the first engaging portion of the retainer, and engagement of a second engaging protrusion of the mounting base portion with the second engaging portion, the depth of said second engaging portion being at least 1.5 to 2.5 times the thickness of said second engaging protrusion.

* * * * *